March 28, 1944.  A. S. KROTZ  2,345,201
VEHICLE SUSPENSION AND SPRING
Filed Dec. 30, 1941   5 Sheets-Sheet 2
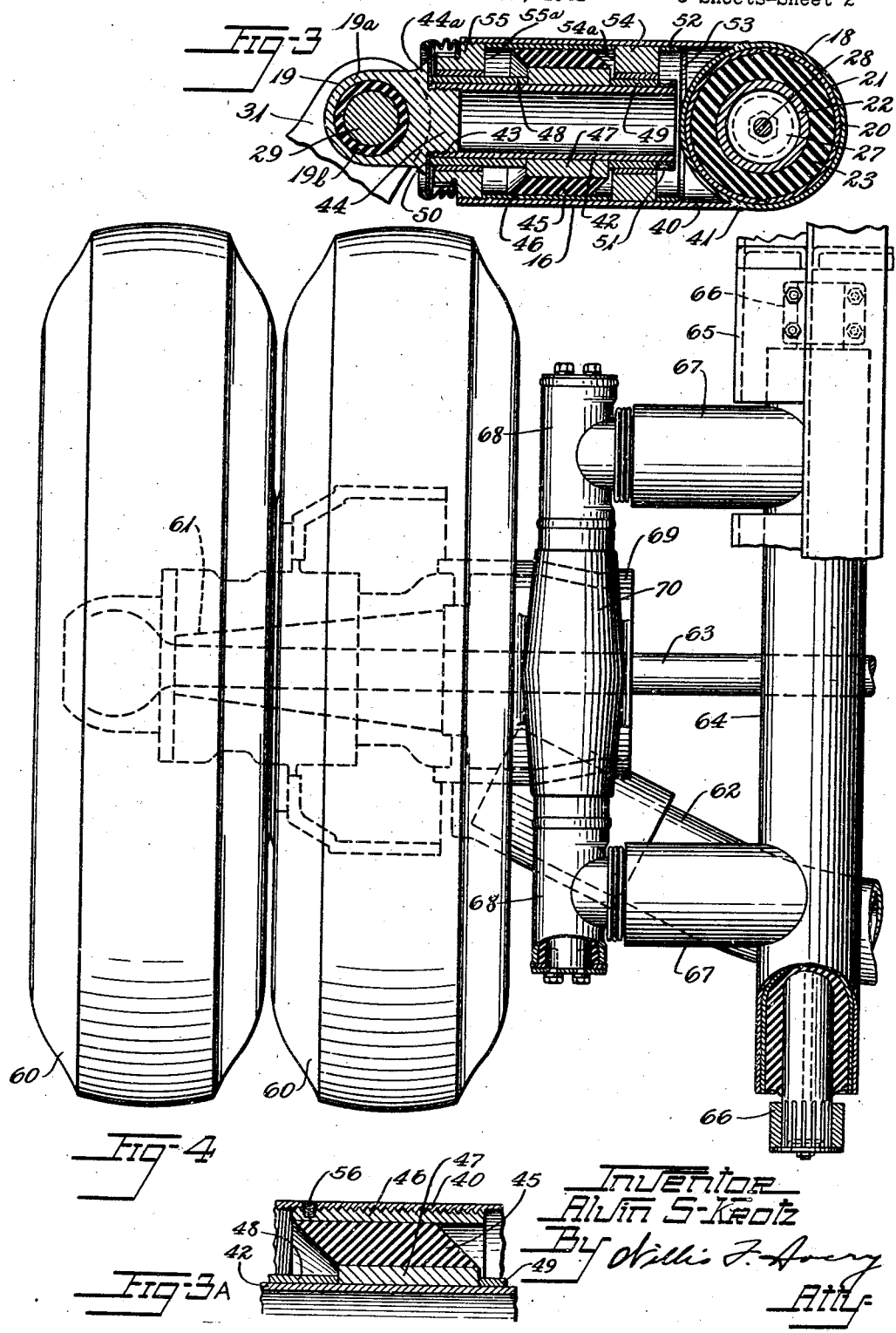

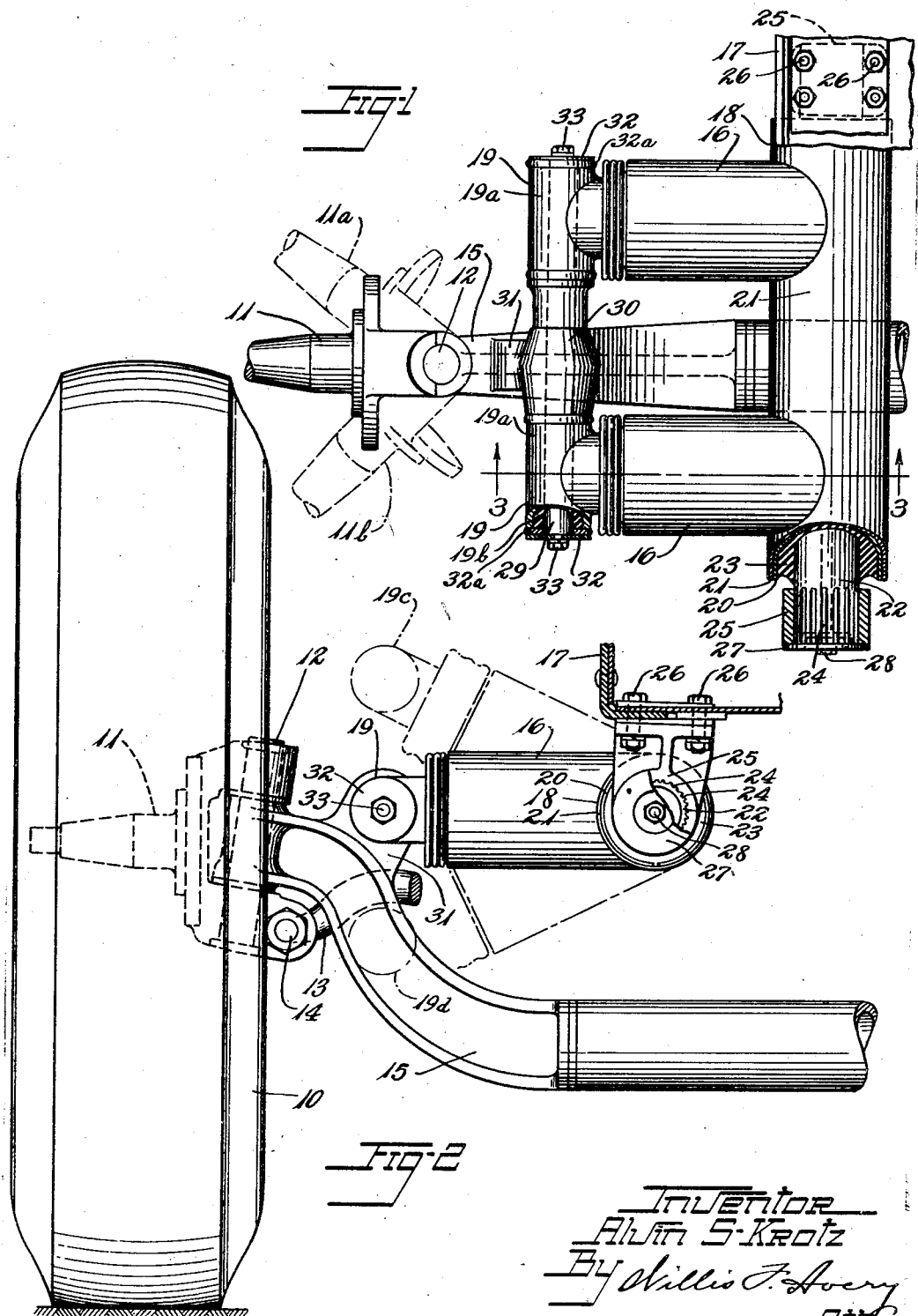

March 28, 1944. A. S. KROTZ 2,345,201
VEHICLE SUSPENSION AND SPRING
Filed Dec. 30, 1941 5 Sheets-Sheet 3
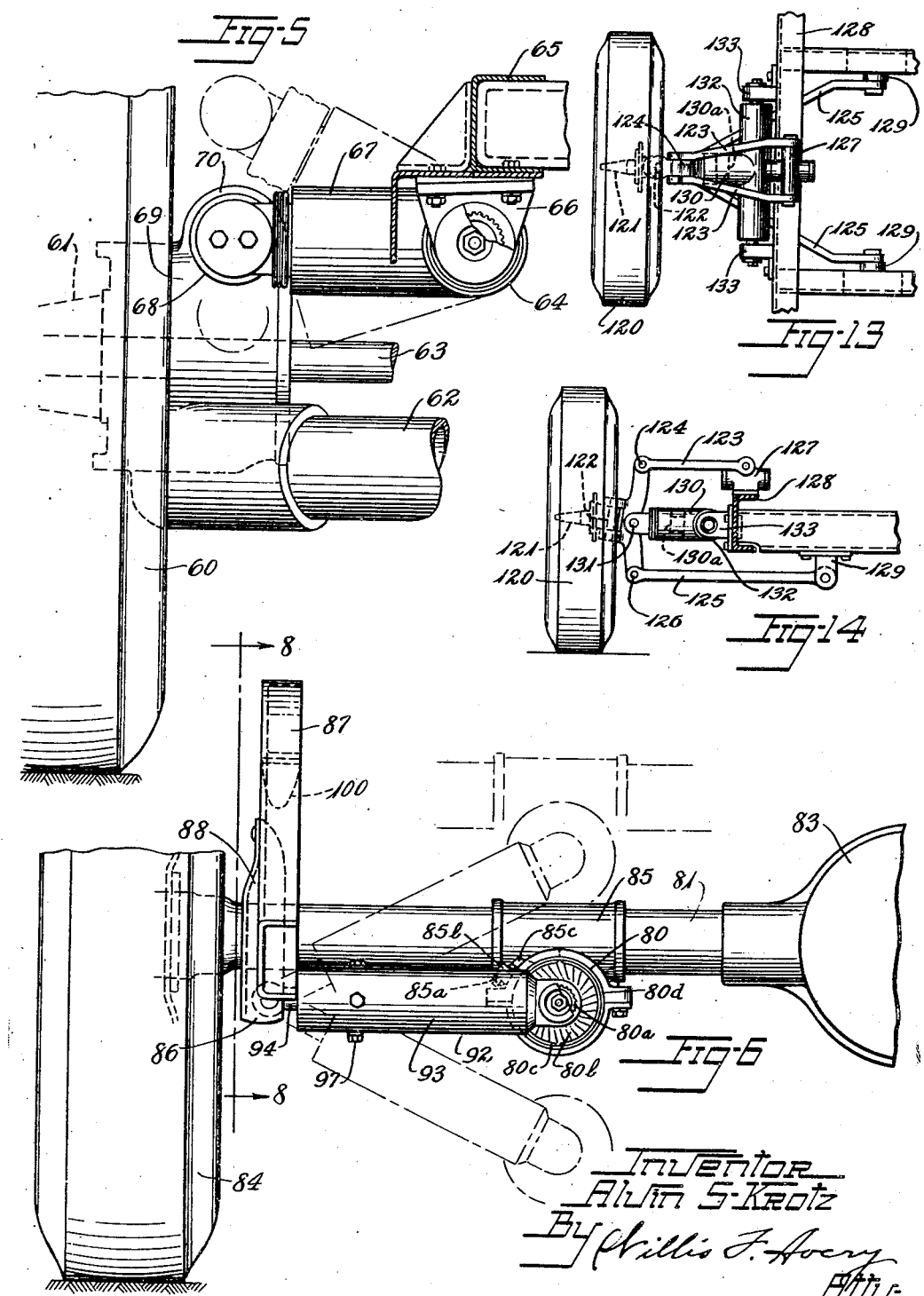

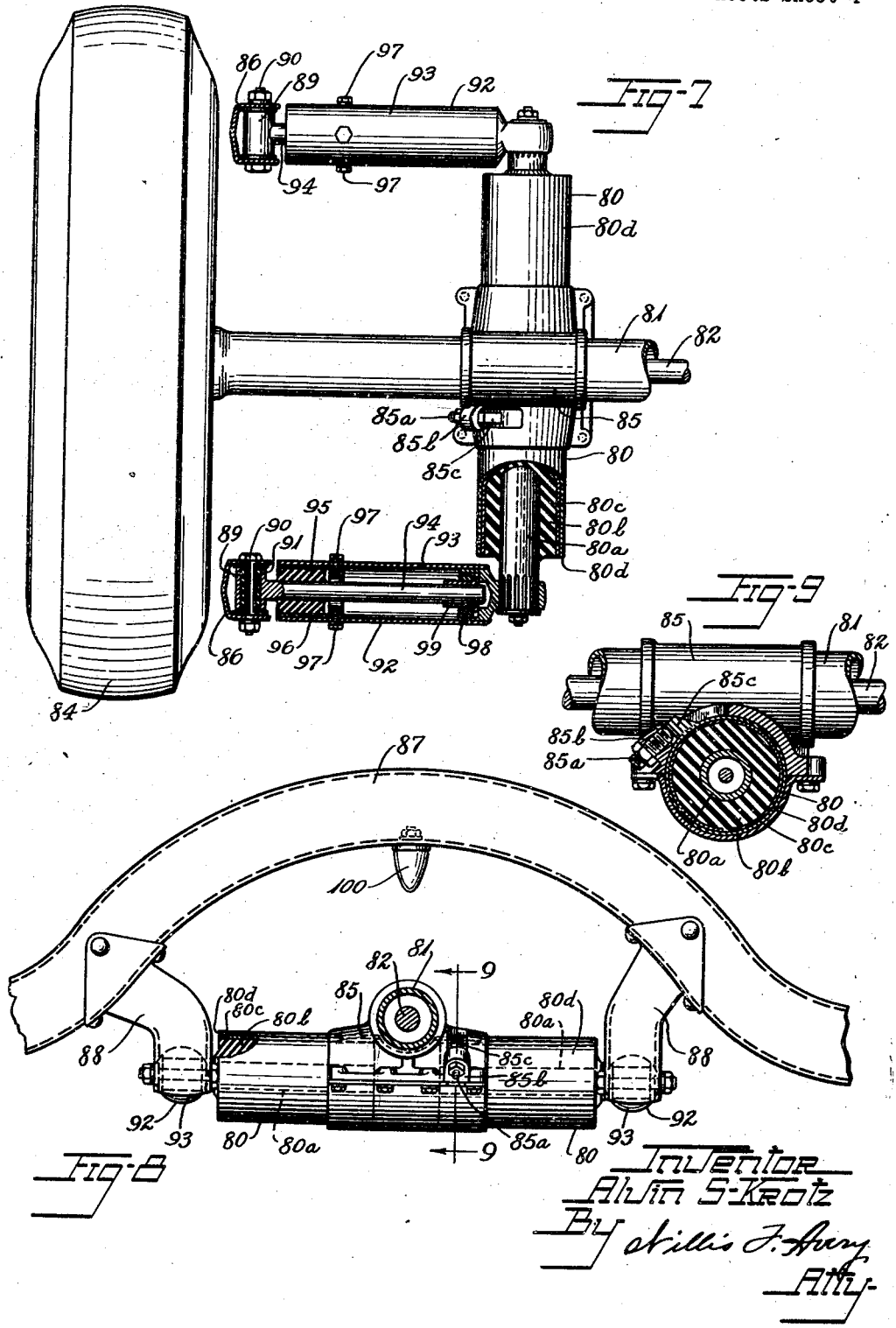

March 28, 1944.  A. S. KROTZ  2,345,201
VEHICLE SUSPENSION AND SPRING
Filed Dec. 30, 1941  5 Sheets-Sheet 5
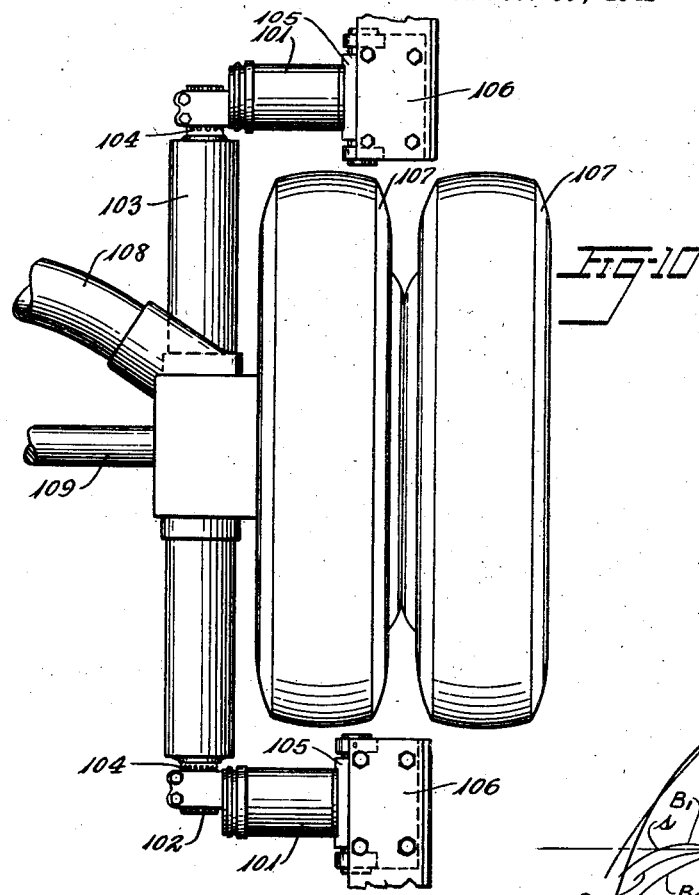
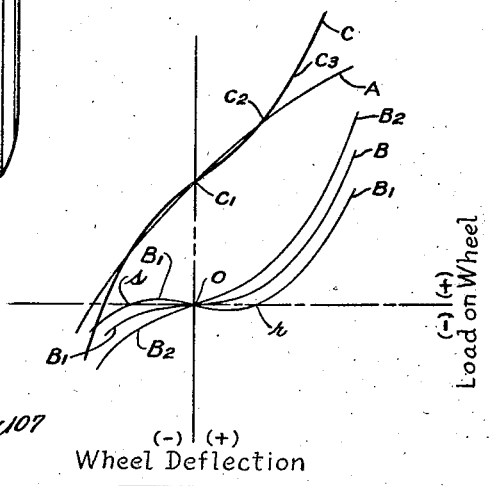
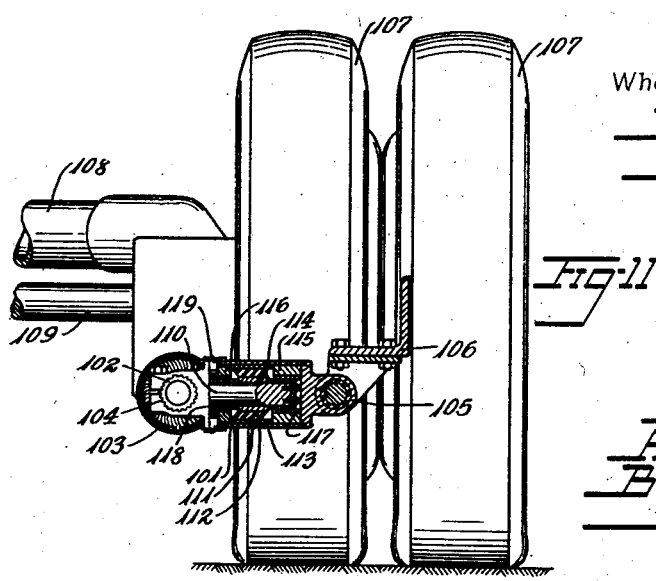

Patented Mar. 28, 1944

2,345,201

UNITED STATES PATENT OFFICE 2,345,201

VEHICLE SUSPENSION AND SPRING

Alvin S. Krotz, Akron, Ohio, assignor to The B. F. Goodrich Company, New York, N. Y., a corporation of New York Application December 30, 1941, Serial No. 424,869

15 Claims. (Cl. 267—21)

This invention relates to vehicle suspensions and to springs, and is useful especially in suspensions for vehicles of the type having wheel connections fixing the lateral spacing of the wheels, such for example as in the case of a through-axle. Features of the invention however are applicable in other suspensions, for example, independent wheel suspensions.

The invention in many of its phases is applicable to rail-trucks as well as to automotive trucks, busses, passenger cars, trailers and the like and to the driving or non-driving ends and to the steering and non-steering ends of such vehicles.

The chief objects of the present invention are to provide for springing by torsional stress of rubber-like material supporting a wheel through an arcuately movable structure, together with means for permitting straight-line vertical movement of the wheel despite the arcuate movement of the connecting structure; to provide a resiliently extensible and contractible link arm for the purpose; to provide for augmenting the action of the torsional spring to give a resulting variable springing rate; and to provide for varying the springing rate to give the characteristics desired.

Further objects are to provide a spring assembly having a variable spring rate for resistance to relative vertical movement; to provide means for resisting the reactions of driving torque and braking torque; to provide for a minimum of wearing parts; to provide durability and compactness of structure, to provide an improved spring of general applicability, and to provide for convenience of manufacture and assembly.

These and further objects will be apparent from the following description, reference being had to the accompanying drawings in which:

Fig. 1 is a plan view of a vehicle steering-end suspension constructed in accordance with and embodying the invention, parts being broken away and sectioned.

Fig. 2 is a front elevation of the vehicle suspension of Fig. 1.

Fig. 3 is a section on an enlarged scale of a portion of the suspension taken along the line 3—3 of Fig. 1.

Fig. 3a is a view like Fig. 3, but showing a portion of a modified construction.

Fig. 4 is a plan view of a driving-end suspension constructed in accordance with and embodying the invention.

Fig. 5 is a rear elevation of the suspension of Fig. 4.

Fig. 6 is a rear elevation of a modified driving-end suspension constructed in accordance with and embodying the invention, parts being broken away.

Fig. 7 is a plan view of the construction of Fig. 6, parts being broken away and sectioned.

Fig. 8 is a section taken along the line 8—8 of Fig. 6.

Fig. 9 is a section on an enlarged scale taken along the line 9—9 of Fig. 8.

Fig. 10 is a plan view of a further modified form of driving-end suspension.

Fig. 11 is a front elevation of the modification of Fig. 10.

Fig. 12 shows characteristic curves for the deflections of a wheel plotted against the loads on the wheel with the springing provided by a vehicle suspension of the invention.

Fig. 13 is a plan view of a still further modified construction.

Fig. 14 is an elevation of the modification of Fig. 13.

The embodiment of Figs. 1, 2 and 3 of the drawings is illustrative of the suspension as applied to the steering end of a vehicle of the heavy-duty type, such for example, as a truck or passenger bus, although passenger cars and other types of vehicles are not excluded. The construction shown here comprises a wheel, indicated generally at 10 in Fig. 2, mounted on a spindle 11 and pivotally mounted at a king-pin 12 for movement to positions 11a and 11b shown by the dotted lines in Fig. 1 to steer the vehicle. Control of movement of the spindle 11 about the king-pin 12 may be by means of any suitable steering linkage, a member of which is shown at 13 in Fig. 2 fixed to the king-pin 12 at 14. The king-pin 12 may be mounted on an axle 15 of the through-axle type as shown, or any other suitable rigid interconnection between the wheels of an end of the vehicle for fixing the lateral spacing of the wheels.

I provide a resilient connection between the vehicle body or frame and the axle of a construction and arrangement to spring the vehicle and to attain other of the related objects of the invention. The resilient connection comprises one or more telescopic links 16, 16, to be more fully described hereinafter, which are pivotally connected at a frame member 17 and the axle 15. Two links, as shown, are desirable to resist the forces of brake reaction tending to rotate the axle by vertical forces at the connection of the links with the axle.

The pivotal connections at the ends of the links 16, 16 are each preferably in the form of a torsion spring or bushing 18 at the frame and in crossed relation with respect to the axle 15 and a pair of pivotal connections 19, 19 at and extending crosswise of the axle 15. The torsion spring or bushing 18 may comprise a discontinuous sleeve member 20 held within an outer housing 21, an inner shaft member 22, preferably hollow, and a body 23 of rubber or other rubber-like material or other suitable resilient means between the sleeve 20 and the shaft 22 for resisting relative rotational and springing movement between the sleeve 20 and the shaft 22 of the bushing 18. The rubber-like material of the spring or bushing 18 may be secured to the sleeve 20 and to the shaft 22 by means of a vulcanized bond, or by any other suitable fastening means, or in some cases, by the friction of the fit, without other attaching means.

The telescopic links 16, 16 are fixed to the housing 21, as by welding the housings together, and the inner shaft 22 is secured, as for example, by means of splines 24, 24, to projecting bracket members 25, 25 at each end of the torsion spring 18 and fastened to the frame member 17 as by means of bolts 26, 26 or other suitable attaching means. Alternatively, the links 16, 16 may be secured to exposed end portions of the shaft 22, and the housing 21 of the bushing 18 may be attached to a frame member. End-plates, one of which is shown at 27, held by a long bolt 28 may be provided to maintain the desired endwise location of the shaft 22 with respect to the brackets 25, 25.

The pivotal connections 19, 19 may comprise outer sleeves 19a, 19a and a common inner shaft 29, the sleeves 19a, 19a and the shaft 29 being separated by bodies 19b, 19b of rubber or other rubber-like material to provide resilient pivotal connections at the axle-end of the links 16, 16. The links 16, 16 are secured to the sleeves 19a, 19a of the mountings 19, 19. The inner shaft member 29 is secured to a bracket member or ear 30 between the connections 19, 19 which member 30 is attached or constructed integral with the axle 15 by means of a connecting portion 31. The sleeves 19a, 19a, to which the telescopic links 16, 16 are secured are capable of rotational movement relative to the member 30 resisted by torsional and compressive stresses in the rubber-like material 19b, 19b, thereby providing resilient pivoting of the links 16, 16 at the axle 15. If desired as an alternative construction, the links 16, 16 may be fastened to exposed end portions of the shaft 29 of the mountings 19, 19 and the sleeves 19a, 19a may have the pivotal connection with ear 30 of the axle 15.

End-plates 32, 32 on the ends of the mountings 19, 19 and suitably fastened as for example, by a through bolt 33 may be provided to secure the mounting assembly and sealing ring members 32a, 32a may be provided to exclude foreign matter from the assembly, if desired.

The springing is effected by the combined action of the torsion spring and one or more springs in the connecting swinging and telescoping link or arm structure which is effective at the same time to permit controlled relative vertical movement between the frame and the axle of the vehicle while restraining the extent of such movement by shear stresses on the resilient rubber-like material of the telescoping connection. Relative movement between the frame and the axle is confined to a substantially vertical path under deflections due to the irregularities of road-bed or track, as indicated by the positions of the pivotal connections at the axle of the vehicle as shown in dotted lines at 19c and 19d in Fig. 2. The forces of the shear stresses in the rubber-like material of the links 16, 16 axially of the links resist vehicle deflections and provide improved cushioning, while placing the amplitude and nature of springing movement under the control of the designer, as desired.

Details of construction of a suitable telescopic link are shown in the illustrative embodiment of Fig. 3 of the drawings, comprising an outer housing 40, attached as by welding or brazing or other suitable attaching means to the housing 21 of the main torsion bushing 18, as indicated at 41. An inner hollow shaft member 42 is attached, as for example by threaded portion 43 to projecting portion 44 of one of the mountings 19.

A body 45 of rubber or other rubber-like material is vulcanized to, cemented to, or otherwise suitably adhered to an outer shell member 46 of the link, which member 46 is fixed with respect to the housing 40 and to an inner member 47 which is fixed with respect to the inner shaft 42. Spacing and bearing sleeve members 48 and 49 are disposed around the shaft 42 and between the inner member 47 and the ends of the shaft 42 to prevent relative lengthwise movement between member 47 and the shaft 42 and to supply sliding surfaces. The spacing member 48 is restrained at the axle end of the link by a shoulder 44a of the member 44, and an end-plate 50 may be provided to prevent the entrance of foreign matter into the telescopic link asembly. The spacing member 49 is held against endwise movement by a collar or raised portion 51 on the frame end of the shaft 42.

The sleeve 46, a short sleeve 52 and a raised portion 53 or bead on the inner surface of the outer housing 40 restrains wear-surface supporting members 54 and 55 in the axial direction, and member 55 is threaded to housing 40 in a manner such that surface portions 54a and 55a of members 54 and 55 are fixed with respect to housing 40 and relative lengthwise movement between the housing 40 and the shaft 42 is guided by sliding contact between the wear-surfaces 54a, 55a and the spacing and bearing members 48 and 49.

The rubber-like material in the bushing, in the mountings and in the telescopic links is preferably mounted under initial radial compression to increase the effectiveness and durability of the assembly.

Alternatively, the housing 40 may be fixed to the pivot 19 at the axle end of the connection and the inner shaft fixed at the bushing 18 at the frame end, as desired.

The telescopic link construction permits relative vertical movement between the frame and the axle of the vehicle by lengthwise sliding movement of the shaft 42 with respect to the housing 40, which vertical movement is resisted by torsional stresses in the rubber-like material of the bushing 18 and by shear stresses in the rubber-like material 45 of the link, the extent of such deflections and the stiffness of springing being controlled by the stiffness and effective shear area of the rubber-like material 45. Despite the fact that the torsion spring alone ordinarily gives a springing rate (force required for a linear unit of deflection) that does not vary materially, a variable springing rate is provided by the present construction, for, as wheel deflection progresses there is a change in the amount of deflection per unit load. It is preferred in most applications to provide for decreasing deflections per unit load as the deflection increases. An example of the variable springing rate provided by the telescopic links in combination with the torsion spring is illustrated by the curves in the graph of Fig. 12, wherein curve A indicates the deflections under load for the torsion spring alone, curves B, $B_1$ and $B_2$ show the deflections under load for the telescopic link alone, and curve C shows the deflections for the combined torsion spring and telescopic spring in the operating condition of the latter represented by the curve $B_1$.

The condition of the vehicle at zero static load, that is, empty of passengers in the case of a bus, is represented by the point 0 in the graph. Changes in wheel deflection are plotted as abscissa, to the right of 0 for increased loading and to the left of 0 for decreased loading from the static empty condition. The ordinates are changes in wheel loading, increasing above 0 and decreasing below 0 from the static empty condition.

The curves B, $B_1$ and $B_2$ are representative of a family of curves showing springing rates at the wheel resulting from variations in the initially adjusted condition of the spring 45 of the telescopic link, disregarding the effect of the torsion spring 18. Where the arrangement or adjustment is such that at the empty static, or neutral, condition of the vehicle the shear spring 45 is under no stress in its axial direction, changes in loading will produce wheel deflection in accordance with curve B. Where the spring 45 in such neutral condition of the vehicle is subjected to shear stress by an axially shortened condition of the telescopic link, the spring is first relieved of such stress as wheel deflection progresses from the point 0 and after this spring passes through zero stress it is stressed in the opposite axial direction. This action results in the curve $B_1$ which crosses the axis of abscissa at points $r$, $s$ where it passes through the condition of zero stress. Where the spring 45 is stressed by elongation of the telescopic link in the neutral condition of the vehicle, the stress in this spring is increased in the same direction resulting in a curve $B_2$ that is steeper than the others.

The combined action of the straight shear spring 45 and the torsion spring 18 is represented by curve C which is the composite of curve A of the torsion spring and one of the family of curves of the straight shear spring, curve $B_1$ being used by way of illustration.

The slope of the curves shows the rate of springing or the amount of load per unit deflection, and the change in the springing rate as deflection increases is indicated by the increasing slope of the curve C for large deflections. Thus, for relatively light loads up to the full-seated capacity of a bus, indicated approximately at the point $C_2$, a relatively soft and steady rate of springing is provided as indicated by the slope of the curve C between points $C_1$ and $C_2$. At full-standee load $C_3$, and for deflections beyond this point, the springing rate increases rapidly to provide greater resistance to deflections resulting from irregularities encountered in the road-bed and under heavy loads.

In the modified construction of Fig. 3a the threaded inner surface of the housing 40 and the matching threads in the outer surface of the short sleeve member 46 provide means for varying the effective resistance of the telescopic link and its adjusted position referred to by permitting manual adjustment of the assembly to change the relative longitudinal disposition of the assembly with respect to the housing. Any other suitable adjusting means may be provided, as desired, and the housing may be fastened to the assembly by any suitable means, as for example by means of a set screw 56.

In the embodiment of Figs. 4 and 5 of the drawings the suspension is shown applied to the rear-end or driving-end of a heavy-duty vehicle of the type having dual rear wheels. Wheels 60, 60 are mounted on a spindle 61 which extends through the wheels 60, 60 and is supported by a through-axle 62. The wheels are driven by means of a torque shaft 63 from an engine or other suitable source of power and through power transmission means (not shown).

Springing of the vehicle is provided for by a torsion bushing 64 mounted on a portion of the frame 65 of the vehicle by means of brackets 66, 66. The torsion bushing 64 is resiliently connected to the axle by means of a pair of telescopic links 67, 67 as hereinbefore described and fixed to mountings 68, 68 which are pivotally connected to wheel member 69 through a fixed member 70.

The telescopic links 67, 67 permit relative vertical springing movement of the chassis and wheels of the vehicle by torsional stresses in the torsion bushing 64, but limit the extent of such movement by shear stresses in the rubber-like material in the links 67, 67 in series with the slip joint of the links. By providing a pair of links, the tendency is resisted for the axle to rotate under the forces of brake and drive reactions.

An embodiment of the vehicle suspension is shown as applied to a rear or driving wheel of a passenger car vehicle in Figs. 6 through 9 of the drawings. The construction shown here comprises a pair of torsion bushings 80, 80 at a wheel, as indicated in Fig. 8, and mounted on a through-axle housing 81 which fixes the lateral spacing of the rear wheels and encloses a torque shaft 82, which shaft transmits driving force from a differential, the housing of which is indicated at 83 in Fig. 6, to the rear wheels of the vehicle, one of which wheels is shown at 84. The bushings 80, 80 may be spaced-apart at the axle housing 81 and each comprises a control shaft member $80a$, an outer discontinuous sleeve $80c$, and a body of rubber or other rubber-like material $80b$ secured thereto as by means of a vulcanized bond. The springs 80, 80 are attached to the axle housing 81 by means of a suitable mounting bracket 85. The torsion bushings 80, 80 may be adjusted rotationally in the housing bracket 85 as desired by means of an adjusting screw $85a$ mounted on a bracket $85b$ in a manner to engage a lug $85c$ secured to the outer housing $80d$ enclosing the bushings 80, 80. A pair of torsion mountings 86, 86 are secured to a frame member 87 by means of brackets 88, 88 and comprise outer shells 89, 89, inner shaft members 90, 90 and bodies 91, 91 of rubber-like material intervening between the shells and the shafts to provide a resilient pivotal connection at the vehicle frame. A pair of telescopic links 92, 92 connect the mountings 86, 86 and the torsion spring 80 and are adapted to permit relative vertical springing movement between the frame and the rear-axle and wheels of the vehicle, while resisting such deflections by a variable stiffness of the spring in the links 92, 92.

A telescopic link 92 of the pair shown in Fig. 7 comprises a housing 93, an inner shaft member 94 fixed to the housing 89 of a mounting 86 and a body 95 of rubber or other rubber-like material between the housing 93 and the shaft 94 for resisting movement of the shaft 94 with respect to the housing 93 by shear stress in the rubber-like material 95 while permitting vertical springing of the vehicle. The rubber-like material in the links 92, 92 is bonded, cured or otherwise suitably fastened to the shaft 94 and a sleeve 96 held at the inner surface of the housing 93 by bolts 97, 97 or other suitable fastening means. A sealing ring 98 of rubber-like material 98, for example, may be provided at the bushing-end of a link 92 to exclude foreign matter from the assembly and may be held as by flange member 99 on shaft 94. Alternatively, the housing 93, 93 may be fixed to mounting 86, 86 and inner shaft members 94, 94 may be fixed to the housing 80, if desired. A rubber bumper 100 may be provided in frame member 87 to prevent metal-to-metal contacts under very severe deflections.

In the embodiment of Figs. 10 and 11 telescopic links 101, 101 are secured to inner shaft 102 of a relatively long torsion spring 103, as by means of splines indicated at 104, 104 and the links 101, 101 extend outwardly of the vehicle to pivotal connections 105, 105 at frame members 106, 106 and laterally positioned to be longitudinally in line with wheels 107, 107 of the vehicle. Portions of the axle and the torque shaft of the vehicle are shown at 108 and 109.

The telescopic link construction of this embodiment comprises an inner shaft member 110 attached to the inner shaft 102 of the torsion bushing 103, an outer housing member 111 attached to the pivotal connection 105 and an intervening body of rubber-like material 112 secured as by means of a vulcanized bond or other suitable attaching means to annular sleeve members 113 and 114. The sleeves 113 and 114 are positioned by means of spacing members 115 and 116 which are fixed with respect to the housing 111 and spacing members 117 and 118 fixed with respect to the shaft member 110. Relative sliding movement between the contacting surfaces of the spacing members 115, 116 and 117, 118 is permitted under relative vertical movement or deflection between the wheels and the body of the vehicle and such movement is resisted by shear stresses in the rubber-like material 112 thereby providing cushioning of the vehicle and a variable rate of stiffness of springing with increasing stiffness for large deflections.

A suitable bellows 119 is provided between the torsion spring 103 and the telescopic link housing 111 to exclude foreign matter from the telescopic link assembly.

The embodiment of Figs. 13 and 14 comprises a vehicle suspension providing for independent springing of a wheel, and illustrates an application of a single telescopic link for each wheel. In the construction shown, a wheel 120 is mounted on a wheel-spindle 121 supporting a king-pin member 122. A pair of shock-absorber link arms 123, 123 are pivotally connected to the upper end of the king-pin 122, as indicated at 124, and a pair of relatively long link arms 125, 125 are pivotally connected to the lower end of the king-pin, as shown at 126. The shock-absorber arms 123, 123 are pivoted at their other ends to a shock-absorber member, indicated generally at 127, and mounted on a frame member 128. The long link arms 125, 125 are pivotally connected at their other ends to bracket members 129, 129 secured to the frame member 128. An end of a single telescopic link 130 incorporating a spring 130a, of the type shown in Fig. 3 for example, is secured to a projecting bracket portion 131 of the king-pin 122 and at its other end to a torsion bushing 132 of the type hereinabove described. The bushing 132 extends lengthwise of the vehicle and is fastened at its ends to bracket members 133, 133 secured to the frame member 128.

To provide for elongation of the telescopic link 130 under vertical movement of the wheel 120 to stress the spring 130a of the link 130, the axis of the torsion bushing 132 is at a lesser distance from the king-pin 122 than are the pivotal connections of the arms 123, 123 and 125, 125 at the frame so that vertical movement of the wheel compels change in length of the link. Thus, a variable rate of springing of the vehicle is provided for by the combined action of the spring 130a in the single telescopic link 130 and the torsion bushing 132.

The arms 125, 125 and 123, 123 may diverge from the king-pin 122 to spaced-apart positions at the frame member 128 in a manner to facilitate resisting the reactions of driving and breaking torque.

Variations may be made without departing from the scope of the invention as it is defined by the following claims.

I claim:

1. A vehicle suspension having a wheel structure and an arm structure connected to effect vertical springing by stress on a torsional spring upon swinging movement of the arm structure, in which said arm structure comprises a pair of relatively reciprocatory members and a spring interposed between said members to cushion relative reciprocatory movement of said members upon swinging movement of the arm structure.

2. A vehicle suspension having a wheel structure and an arm structure connected to effect vertical springing by stress on a torsional spring upon swinging movement of the arm structure, in which said arm structure comprises a pair of relatively reciprocatory members and a body of resilient rubber-like material mounted between said members to cushion relative reciprocatory movement of said members.

3. A vehicle suspension having a wheel structure and an arm structure connected to effect vertical springing by stress on a torsional spring upon swinging movement of the arm structure, in which said arm structure comprises a pair of relatively reciprocatory members and a body of resilient rubber-like material mounted between said members to cushion relative reciprocatory movement of said members by shear stress on said body of resilient material.

4. A vehicle suspension having a wheel structure and a connecting arm structure subject to swinging movement upon vertical movement of said wheel structure, said suspension comprising a body of resilient rubber-like material mounted to resist swinging movement of said arm structure by torsional stress of said body, and said arm structure comprising telescopically associated members subject to telescopic movement upon swinging movement of the arm structure and a body of resilient rubber-like material mounted between said members to resist such telescopic movement thereof.

5. A vehicle suspension comprising laterally spaced-apart wheels, a rigid interconnection determining the lateral spacing throughout vertical movements of the wheels, arms subject to arcuate swinging movements by the vertical wheel movements, and torsion springs resisting such swinging movements of the arms, said arms each comprising relatively movable elements for permitting change of length of the arm structure and springing means interposed between said members to cushion the relative movement thereof.

6. A vehicle suspension comprising laterally spaced-apart wheels, a rigid interconnection determining the lateral spacing throughout vertical movements of the wheels, arms subject to arcuate swinging movements by vertical wheel movements, and bodies of rubber-like material mounted to resist such swinging movements of the arms, said arms each comprising telescopically associated members for permitting change of length of the arm structure and a body of resilient rubber-like material between said members to cushion the relative movement thereof by shear stress on such body.

7. A vehicle suspension comprising a wheel axle having a wheel mounted thereon, a torsion spring of resilient rubber-like material mounted inboard of said wheel, a pair of arms attached to said spring and extending outward therefrom in spaced-apart relation longitudinally of the vehicle, and means connecting said arms to said axle, said arms each comprising telescopically associated members and a body of resilient rubber-like material mounted to resist telescopic movement of said members by shear stress on said body.

8. A spring construction comprising a body of resilient rubber-like material for effecting springing by torsional stress on said body, and an arm structure extending from said spring for imposing such torsional stress, said arm structure comprising a pair of members movable with relation to each other to change the effective length of said arm structure and a body of rubber-like material mounted between said members for resisting relative movement thereof.

9. A spring for a vehicle suspension comprising a body of resilient rubber-like material, an inner shaft element and an outer sleeve element secured to the body for imposing torsional stress on the body by relative movement of said elements, an arm structure projecting laterally from one of said elements and connected for swinging movement of the arm structure upon vertical movement of a vehicle wheel, said arm structure comprising an outer sleeve element, an inner connecting member relatively movable axially, and a body of resilient rubber-like material mounted between said sleeve element and member to cushion such relative axial movement.

10. A spring as defined in claim 9 in which the inner connecting member of said arm structure is mounted for reciprocatory movement in spaced-apart bearings in the sleeve element and the body of resilient rubber-like material surrounds the inner member between said bearings and is secured to the inner member and to the sleeve element.

11. A spring construction comprising a body of resilient rubber-like material, an inner shaft element and an outer sleeve element secured to the body for imposing torsional stress on the body by relative movement of said elements, a second sleeve element secured to the first said sleeve element and projecting laterally therefrom, an arm member mounted for relative reciprocatory movement within the second said sleeve element, and a body of resilient rubber-like material in the second said sleeve element to resist said relative reciprocatory movement.

12. A spring construction as defined in claim 11 in which the body of resilient material is mounted in said second sleeve element to resist the reciprocatory movement by shear stress in the body.

13. A spring construction comprising a body of resilient rubber-like material, an inner shaft element and an outer sleeve element secured to the body for imposing torsional stress on the body by relative movement of said elements, additional sleeve elements secured to the first said sleeve element and projecting laterally therefrom, arm members in said additional sleeve elements mounted for relative reciprocatory movement with respect to said sleeve elements, and bodies of resilient rubber-like material in said additional sleeve elements to resist said reciprocatory movement.

14. A spring assembly comprising a structure mounted for both radial and circumferential movement with respect to an axis, a bushing of rubber-like material at said axis having a laterally projecting arm structure connected to said structure for resisting movement of the structure by torsional stress on said body of rubber-like material about said axis, said arm structure comprising telescopically associated parts and a body of resilient rubber-like material resisting telescopic movement of said parts during swinging of said arm about said axis under movement of said structure.

15. A spring assembly comprising supporting and supported structures and springing means interconnecting them, said means including a body of resilient rubber-like material for effecting springing movement by torsional shear stress on said body, a second body of resilient rubber-like material for effecting rectilinear springing movement by straight shear stress on such second body, and means connecting said bodies for compounding the springing action of said bodies.

ALVIN S. KROTZ.